Sept. 30, 1952   F. D. GREENLEAF   2,612,630
ELECTRICAL CONVERSION NETWORK
Filed Aug. 30, 1949
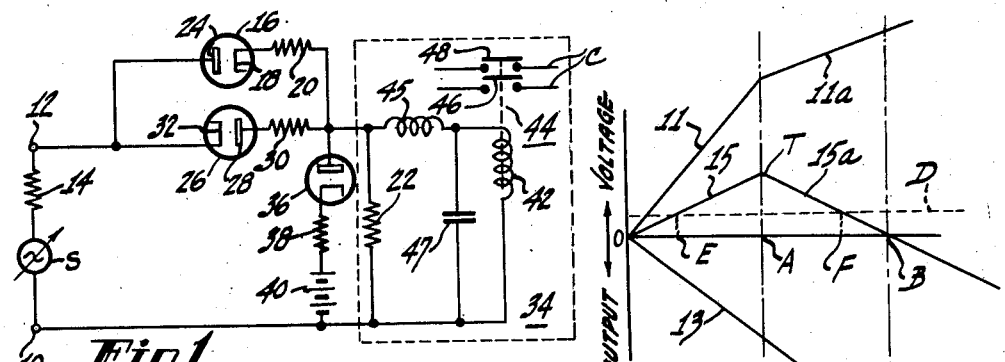
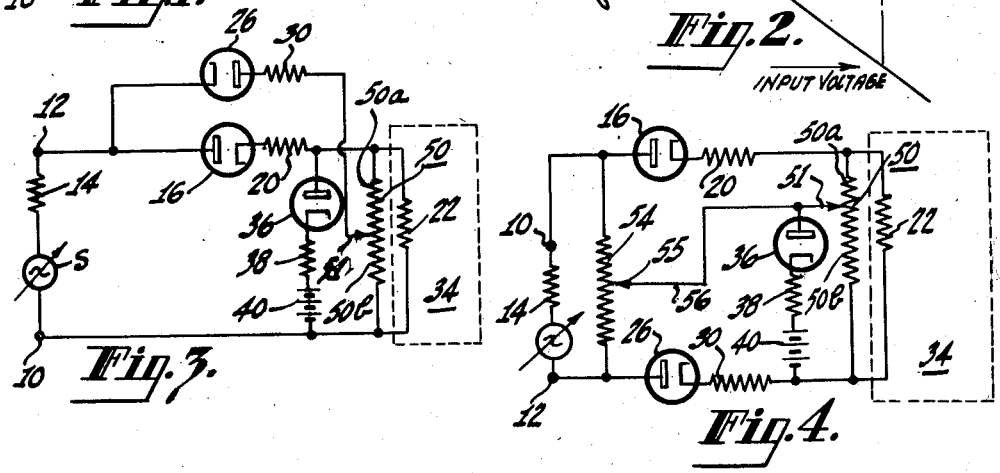
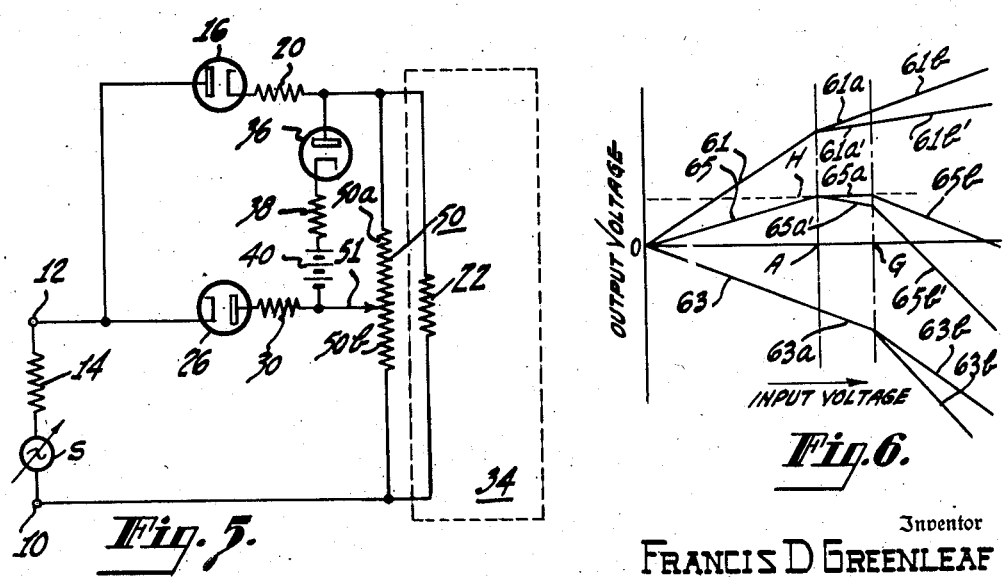
Inventor
FRANCIS D GREENLEAF
Attorney Patented Sept. 30, 1952

2,612,630

UNITED STATES PATENT OFFICE 2,612,630

ELECTRICAL CONVERSION NETWORK

Francis D. Greenleaf, Oaklyn, N. J., assignor to Radio Corporation of America, a corporation of Delaware Application August 30, 1949, Serial No. 113,075

12 Claims. (Cl. 321—32)

1

This invention relates to electrical networks for converting a variable magnitude alternating input voltage into an output voltage having a predetermined non-linear relation to the alternating input voltage and, while not limited thereto, finds particular application in control apparatus wherein a controlling condition is represented as a variable magnitude alternating voltage.

In some instances, it is necessary to control the operation of a work unit in such a way that the work unit will be operative only when the value of an external condition is within predetermined limits. For example, the work unit may be an electrical device which is to be connected to a voltage supply line only when the magnitude of the supply voltage is within predetermined limits. More specifically, manufacturing and fabricating processes sometimes require that the process be interrupted if the value of a condition, such as the temperature of a work piece, for example, either rises above one predetermined level or falls below a second predetermined level. In such cases, it is necessary to have the controlled work unit respond in the same way at two different values of the controlling condition.

It is well known to have control systems wherein two or more relays are set to respond to energizing voltages of different magnitudes, so that one of the relays will complete a circuit through a work unit when the relay energizing voltage has some predetermined low value while the other relay will open the work circuit when the relay energizing voltage has some predetermined higher value. However, such systems are relatively inflexible since the parameters of all of the relays must be changed when the operating limits of the system are changed. Moreover, if the system is at all complex, a relatively large number of relays is required, thereby increasing the number of parts subject to wear and the accompanying maintenance problems.

If the controlling condition in an apparatus of the foregoing type is represented as a variable magnitude alternating voltage, the problems just referred to can be minimized if a network is available to convert the alternating voltage into a control voltage which will have one value corresponding to two different input voltage values, since the number of relays or similar voltage-responsive devices required will be reduced.

It is, accordingly, a general object of my present invention to provide an electrical conversion network for converting a variable magnitude alternating input voltage into an output voltage which changes in magnitude nonlinearly as the magnitude of the input voltage changes.

2

A more specific object of my invention is to provide an electrical conversion network for producing a unidirectional voltage which first increases and then decreases in magnitude as the magnitude of an alternating voltage supplied thereto increases in magnitude.

Another object of my invention is to provide an improved network to control the operation of a work unit in accordance with variations in the magnitude of an alternating control voltage representing a controlling condition.

A further object of my invention is to provide a control network for energizing a voltage-responsive device only when the magnitude of an alternating control voltage supplied to the network is within predetermined limits.

In accordance with the invention, the foregoing and other objects and advantages are attained in an electrical conversion network including rectifier circuits connected to convert an alternating input voltage into two unidirectional voltages, together with means to combine these voltages in polarity opposition to form a resultant output voltage, the arrangement of the rectifier circuits being such that the components of the output voltage will increase at unequal rates as the magnitude of the alternating input voltage increases to a predetermined value, whereupon the relative rates of increase of the components will change, so that the magnitude of the network output voltage will have a predetermined nonlinear relation to that of the input voltage.

A more complete understanding of the invention can be had by reference to the following description of illustrative embodiments thereof, when considered in connection with the accompanying drawing, in which Figure 1 is a schematic diagram of a conversion network arranged in accordance with my invention, Figure 2 is a graph showing the input-output voltage relations in the network of Fig. 1, Figures 3, 4, and 5 are schematic diagrams of modified forms of conversion networks arranged in accordance with my invention, and Figure 6 is a graph showing the input-output voltage relations in the network of Fig. 5.

As shown in Fig. 1 of the drawing, a conversion network and control system embodying my invention comprises a pair of input terminals 10, 12 which can be connected to any suitable source of variable magnitude alternating voltage S having an internal resistance which is represented as a resistor 14. A first rectifying circuit is connected between the terminals 10, 12 and includes a rectifier element 16, such as a diode vacuum tube, a crystal rectifier, or the like, having a cathode electrode 18 connected through two resistors 20, 22 to one input terminal 10, and an anode electrode 24 connected to the other input terminal 12. A second rectifying circuit also is connected between the terminals 10, 12, and includes a second rectifier element 26 having an anode electrode 28 connected to the input terminal 10 through a resistor 30 and the resistor 22, and a cathode electrode 32 connected to the other input terminal 12.

In the rectifying circuit just described, the resistors 20 and 30 are to be understood to include the "internal" resistances of the rectifiers 16 and 26, respectively, and may, in some cases, comprise only the rectifier resistances. The resistor 22 is intended to include the effective load resistance presented to the conversion network by a control circuit 34 which will be described in detail hereinafter.

The network shown in Fig. 1 also includes a third rectifier element 36 which is connected in series with a resistor 38 and a bias voltage source 40 across the load resistor 22, with the rectifier 36 being connected in the same polarity with respect to the input terminals 10, 12 as the rectifier 16. As in the case of resistors 20 and 30, the resistor 38 includes the internal resistance of its associated rectifier 36, and may comprise only the rectifier resistance.

In accordance with the invention, the network of Fig. 1 is so arranged that unidirectional voltages of unequal magnitude and opposite polarity will be developed across the load resistor 22, so that a resultant output voltage will be developed across the load resistor 22, the arrangement being such that the resultant output voltage will increase at first as the alternating input voltage increases, and then will decrease and eventually will reverse in polarity as the alternating input voltage continues to increase.

Disregarding the circuit of the rectifier 36 for the moment, it can be seen that the two rectifiers 16, 26 will convert alternating voltage at the input terminals 10, 12 into unidirectional voltages of opposite polarity across the output load resistor 22, so that, by suitably proportioning the various resistances in circuit with the rectifiers 16, 26, a unidirectional voltage of predetermined polarity can be developed across the resistor 22.

The resistance in circuit with the rectifier 16 comprises the series combination of the resistors 14, 20, and 22, so that the unidirectional voltage component across the load resistor 22 due to the rectifier 16 will be proportional to the ratio between the resistance of the resistor 22 and the sum of the resistances of the resistors 14, 20, and 22. This relation can be expressed as the ratio of the output load resistance to the total rectifier circuit resistance, where the term "output load resistance" is used to designate the effective resistance of the load to which voltage is delivered by a rectifier. Similarly, the resistance in circuit with the rectifier 26 comprises the series combination of the resistors 14, 30 and 22, and the voltage component across the load resistor 22 due to the rectifier 26 will be proportional to the ratio between the output load resistance (the resistor 22) and the total rectifier circuit resistance (the resistors 14, 30 and 22).

By making the ratio of output load resistance to total rectifier circuit resistance greater for the circuit of the rectifier 16 than the corresponding ratio for the circuit of the rectifier 26, the voltage component contributed by the rectifier 16 to the resultant voltage across the output resistor 22 can be made greater than the opposite polarity component contributed by the rectifier 26, thereby causing the resultant voltage across the resistor 22 to increase as the input voltage increases and to correspond in polarity to the output voltage of the rectifier 16. This, of course, can be accomplished in the network of Fig. 1 by making the resistance of the resistor 20 less than that of the resistor 30.

The effect of the rectifier 36 on the output voltage can best be explained in terms of the same resistance ratios referred to above (i. e., output load resistance to total circuit resistance). As soon as the voltage across the load resistor 22 due to the rectifier 16 becomes slightly greater than the voltage of the bias source 40, the rectifier 36 will conduct current during the same half cycles of input voltage as the rectifier 16, but, of course, will not conduct current on the alternate half cycles during which the rectifier 26 will conduct. Consequently, for values of input voltage sufficiently large to cause conduction in the rectifier 36, the effective resistance in circuit with the rectifier 26 will remain unchanged, while the effective output load resistance for the rectifier 16 will comprise the parallel combination of the resistors 22 and 38, because the resistor 38 effectively will be in parallel with the resistor 22 (as far as the rectifier 16 is concerned) when the rectifier 36 conducts. This, in turn, will change the ratio of output load resistance to total circuit resistance for the rectifier 16. Various relations between the network input and output voltages can be obtained by suitable adjustment of this ratio.

It will be understood that the output voltages of the rectifiers 16, 26 will be pulsating unidirectional voltages derived from alternate half cycles of the input voltage and that the network output voltage across the resistor 22 will have an unsymmetrical alternating voltage waveshape. However, since all of these voltages will have an average unidirectional component, they will all be referred to as unidirectional voltages since it is the average value of the voltage which is of interest in each case. As far as the unsymmetrical alternating output voltage of the network is concerned, it will be appreciated that suitable filtering will provide a truly unidirectional voltage in all cases where such a voltage is required.

In Fig. 2, there is shown a graph illustrating typical input voltage-output voltage relations for the conversion network of Fig. 1. In Fig. 2, wherein unidirectional output voltages are plotted as ordinates against alternating input voltage as the abscissae, lines 11, 13, and 15 represent the output voltages of the rectifiers 16, 26 and the resultant network output voltage, respectively, as the input voltage increases from 0 to some value A. Throughout the range 0—A of input voltage in Fig. 2, the ratio of output load resistance to total circuit resistance for the rectifier 16 is assumed to be greater than the same ratio for the rectifier 26, as previously described, so that the lines 11, 13 have unequal "absolute" slopes (i. e. unequal numerical values of slope, without regard to algebraic sign) with respect to the abscissa reference line. When the input voltage has increased to the value A, it is assumed that the peak value of the voltage across the resistor 22 due to the rectifier 16 is equal to the bias voltage of the source 40 so that the rectifier 36 will begin to conduct current. Also, it is assumed that the ratio of output load resistance to total circuit resistance for the rectifier 16 becomes smaller than the same ratio for the rectifier 26 after the rectifier 36 begins to conduct, so that the slope of the line 11a representing the output voltage of the rectifier 16 after conduction in the rectifier 36 is substantially less than that of the line 11, and also is less than that of the line 13. Consequently, the slope of the line 15 changes at the point T, and the line 15a shows the decrease in network output voltage which will occur when the alternating input voltage increases above the value A.

At some higher value B of alternating input voltage, the output voltage will reverse in polarity, as shown by the line 15a crossing the abscissa at point B.

It will be understood that the value A of alternating input voltage at which the transition T in output voltage occurs can be regulated by adjusting the magnitude of the bias voltage from the source 40; also, that the slopes of the lines 11, 11a, 13, 15, 15a can be varied within reasonable limits by varying the relations between the resistance ratios referred to above. That is, any or all of the resistors 14, 20, 22, 30, 38 can be made variable to permit adjustment of resistance ratios. Furthermore, it is evident that the relative polarity of the network output voltage can be reversed, if desired, by reversing the polarities of the rectifiers 16, 26, 36 and of the bias source 40.

The output voltage across the resistor 22 in Fig. 1 can be used to govern the operation of any desired type of voltage-responsive element. For example, there is shown a relay control circuit 34 in which the operating winding 42 of a relay 44 is connected to receive operating voltage from the conversion network, with a choke coil 45 and a filter condenser 47 being provided to filter pulsations from the network output voltage in order to avoid "chatter" in the operation of the relay 44.

The relay 44 is provided with contacts 46, 48 which are arranged to complete a voltage supply circuit C for any desired electrical device (not shown) when the relay is energized. It will, of course, be understood that some minimum amount of voltage will be required to energize the relay 44, and that the exact magnitude of this minimum energizing voltage will be dependent on the relay design parameters. For example, the relay design may be such that the relay 44 will be energized and will complete the circuit C through the contacts 46, 48 only when the network output voltage is approximately equal to or greater than the level represented by the broken line D in Fig. 2. Consequently, the relay will be energized only as long as the magnitude of the network input voltage is within the range E—F on the graph of Fig. 2.

It should be noted that other types of voltage responsive elements can be substituted for the relay 44 as a control element. For example, a grid-controlled gas tube could be substituted for the relay 44 as a control element, and may be preferable in systems where very accurate response is required.

In Fig. 3 there is shown an alternative form of conversion network arranged in accordance with the invention which is slightly more complex than the network of Fig. 1, but which is somewhat more flexible as far as adjustments in the relative slopes of the output voltages are concerned.

The network of Fig. 3 includes a potentiometer type resistor 50 in addition to the elements shown in the network of Fig. 1, with the resistor 50 being connected in shunt with the load resistor 22, and the rectifier 26 (the output of which does not change when the rectifier 36 conducts) being connected to the potentiometer tap 51 rather than directly to the load resistor 22 as in Fig. 1. For convenience of reference, the upper and lower portions of the potentiometer 50 are designated 50a and 50b, respectively, and will be referred to as separate resistors 50a, 50b.

In the network of Fig. 3, the resistance in circuit with the rectifier 26 comprises that of the series combination of the resistor 14, the resistor 30, and the resistor 50b in parallel with the series combination of the resistors 50a and 22. The resistance in circuit with the rectifier 16 is the same as in the network of Fig. 1, except for the simple parallel relation between the resistors 50, 22. Since the resistors 50a and 22 appear in series across the resistor 50b as far as the circuit of the rectifier 26 is concerned, the two resistors 50a and 22 form a voltage divider, the relation between the elements of which will be a major factor in determining the magnitude of the voltage component contributed by the rectifier 26 to the network output voltage. Stated somewhat differently, the output of the rectifier 26 will be subject to two voltage dividing effects; one due to the relation between the resistors 50b, 50a, 22 and the resistors 14, 30, 50b, 50a, 22, and the other due to the relation between the resistor 22 and the resistors 22, 50a. It is evident that the potentiometer 50 allows adjustments to be made in the output voltage slope without disturbing the resistors 20, 30. This feature is thought to be advantageous in some situations.

As has been shown, the necessary inequalities between the rectifier output voltages, and the changes in these inequalities, can be obtained in several different ways. In connection with the relatively simple network of Fig. 1, for example, the ratio of output load resistance to total circuit resistance was referred to in explaining the resistance relations in the network and the effect of those relations on the network output. This simple ratio does not provide a complete explanation of the input-output voltage relations in the network of Fig. 3, since an additional ratio (that of resistor 22 to resistors 50a, 22) must be considered in this case. Nevertheless, in both cases, it is evident that conduction in the rectifier 36 causes a change in the total resistance in the circuit of one of the rectifiers 16, 26, and although an additional voltage divider effect may be present as far as the exact output voltage inequalities are concerned, it is the change in resistance in some portion of one of the rectifier circuits which causes the desired transition in the network output voltage curve. Although a resistance relation similar to that stated for the network of Fig. 1 can be developed for other networks embodying the principles of the invention, such expressions become somewhat involved in the more complex cases and are not believed necessary to an understanding of the invention.

A further embodiment of the invention is shown in Fig. 4, wherein the rectifiers 16, 26 are connected to opposite ones of the input terminals 10, 12. A potentiometer 50 is connected in parallel with the load resistor 22, and a second potentiometer 54 is connected across the input terminals 10, 12, with the potentiometer arms 51, 55 being interconnected by a conductor 56. It will be understood that a tapped secondary winding of a transformer could be connected between the terminals 10, 12 as a substitute for the potentiometer 54. The circuit of the rectifier 36 is connected in shunt with one portion 50b of the potentiometer 50.

The operation of the network of Fig. 4 is similar to that already described for the networks of Figs. 1 and 3, with the exception that the potentiometer 54 provides an additional means for adjusting the magnitude inequalities between the opposite polarity unidirectional voltages developed by the rectifiers 16, 26 across the load element 22. The shunting effect of the circuit of the rectifier 36 will operate to alter the resistance of only a part 50b of the potentiometer 50, rather than the entire resistance of the potentiometer 50 as in Fig. 3.

In Fig. 5, there is shown a further modified form of the invention which is more flexible than any of the networks thus far described, although correspondingly somewhat more complex in operation.

In the network of Fig. 5, a potentometer 50 is connected in parallel with the load resistor 22, and the rectifier 26 is connected to the potentiometer arm 51, as in the network of Fig. 3. The circuit of the third rectifier 36 is connected in parallel with a portion 50a of the resistor 50, as in the network of Fig. 4. However in the network of Fig. 5, the relative polarities of the two rectifiers 26, 36 are such that a conductive path is provided between the input terminals 10, 12 both through the rectifiers 26, 36 (i. e. through the rectifier 26, the resistor 30, the voltage source 40, the resistor 38, the rectifier 36, and the resistor 22) and through the rectifiers 16, 36, whereas in the network of Fig. 4, a conductive path is provided between the terminals 10, 12 only through the rectifiers 16, 36. With this arrangement, input-output voltage relations can be obtained which are not possible with the networks of Fig. 1, 3 or 4.

The dual voltage divider effect referred to above in connection with the networks of Figs. 3 and 4 applies also to the network of Fig. 5. Considering the unidirectional voltage developed by the rectifier 26 between the potentiometer arm 51 and the terminal 10, it is evident that the resistor 50a and the load resistor 22 form a voltage divider in parallel with the resistor 50b. Also, it can be seen that the polarity of the voltage developed across the resistor 50a by the rectifier 26 will be such as to cause conduction in the rectifier 36 provided this voltage becomes greater than that of the bias source 40. Consequently, as far as the circuit of the rectifier 26 is concerned, the resistor 38 effectively will be connected in shunt with the resistor 50a for values of input voltage greater than some predetermined value, thereby producing a discontinuity in the input-output voltage relations for the rectifier 26. This discontinuity will have an effect on the network output voltage somewhat similar to the discontinuity effect which also will occur in connection with the combined operation of the rectifiers 16, 36. The two discontinuities in the rectifier output voltages will appear in the network output voltage, making it possible to obtain a variety of different results with the network of Fig. 5, two of which are shown by way of example in the graph of Fig. 6.

In Fig. 6, lines 61, 63, and 65 represent the individual voltages across the resistor 22 due to the rectifiers 16, 26, and the resultant thereof, respectively, prior to conduction in the rectifier 36. The same reference numerals with the subscript $a$ denote the same voltages during periods of simultaneous conduction in the rectifiers 16, 36, and with the subscript $b$ denote the same voltages during periods when the rectifier 36 conducts both in conjunction with the rectifier 16 and with the rectifier 26. The subscripts $a'$, $b'$ have the same significance as the subscripts $a$, $b$, but denote two different sets of resistance values in the network of Fig. 5.

In connection with Fig 6, it has been assumed that the relative magnitudes of the resistors 14, 20, 22, 30, 38, 50a, 50b, have been so selected that the voltage across the resistor 22 due to the rectifier 16 will increase more rapidly than the voltage due to the rectifier 26 as the alternating input voltage increases from 0 to some value A, all as was described previously in connection with Figs. 1 and 2. This is illustrated by the lines 61, 63, 65 in Fig. 6. When the input voltage has a value equal to or greater than A, it has been assumed that the rectifier 36 will conduct current simultaneously with the rectifier 16, thereby changing the resistance relations in the circuit of the rectifier 16, and causing a decrease both in the effective output of the rectifier 16, as represented by the line 61a (or 61a'), and in the network output voltage, as represented by the line 65a (or 65a'). There is, of course, no change in the circuit of the rectifier 26 when the network input voltage reaches the value A, so the line 63a has the same slope as the line 63.

When the network input voltage reaches some higher value B, the voltage across the resistor 50a due to the rectifier 26 will be sufficiently large to overcome the biasing voltage of the source 40, thereby causing the rectifier 36 to conduct simultaneously with the rectifier 26 as well as with the rectifier 16. However, due to the voltage divider action of the resistors 50a, 22, the result will be an increase in the rate of change in effective output voltage of the rectifier 26, as shown by the line 63b (or 63b') in Fig. 6, rather than a decrease, because the resistor 38 effectively will be placed in shunt with the resistor 50a, thereby causing a smaller voltage loss across the portion 50a of the voltage divider 50a, 22. Consequently, the network output voltage will decrease more rapidly as the input voltage increases above the value G, as shown by the line 65b (or 65b') in Fig. 6.

The network output voltage represented by the lines 65, 65a, 65b can be used to advantage where it is desired to have a voltage which increases and decreases at relatively rapid rates yet which does not increase above some predetermined value (e. g. a value H in Fig. 6). That is, the network output voltage curve can be flattened out in the central portion thereof (line 65a in Fig. 6) while providing sufficiently steep input and output voltage slopes to insure positive response of the load device.

Since many changes could be made in the networks shown and described, all within the scope and spirit of the invention, the foregoing is to be construed as illustrative and not in a limiting sense.

What is claimed is:

1. In an electrical network for converting variable magnitude alternating voltage into a voltage non-linearly related in magnitude to the magnitude of said alternating voltage, input terminals in said network for an alternating voltage source, an output load element, rectifying circuits connected between said input terminals and said load element to develop across said load element a resultant voltage containing opposite polarity unidirectional voltage components derived by said rectifying circuits from said alternating voltage, means in said rectifying circuits providing magnitude inequalities between said unidirectional voltages, and a circuit connected in shunt with a portion of one of said rectifying circuits and responsive to voltages of greater than a predetermined magnitude across said shunted circuit portion to alter said voltage magnitude inequalities whereby to alter the magnitude relations between said resultant voltage and said alternating voltage.

2. A network as defined in claim 1 wherein said shunt circuit comprises a rectifier and voltage source means connected to prevent current flow in said rectifier until the voltage across said shunted circuit portion exceeds said predetermined magnitude.

3. A network as defined in claim 1 wherein said means includes resistive elements in one of said rectifying circuits forming with said load element a voltage divider.

4. An electrical conversion network for converting variable magnitude alternating voltage into a voltage non-linearly related in magnitude to the magnitude of said alternating voltage, said network comprising a first circuit including a plurality of resistive elements and a rectifier connected to convert said alternating voltage into a first unidirectional voltage across said resistive elements, a second circuit comprising resistive elements including one of said first-named resistive elements and a second rectifier oppositely poled with respect to said first rectifier and connected to convert said alternating voltage into a second unidirectional voltage of polarity opposite to said first unidirectional voltage across said one resistive element, said first and second circuit resistive elements being proportioned to provide inequalities in the magnitudes of said unidirectional voltages, and a third circuit connected in shunt with a portion of said first circuit and including means conductive in response to a voltage of predetermined magnitude developed across said shunted circuit portion by said first rectifier to reduce the effective resistance only in said first circuit.

5. A network as defined in claim 4 wherein said third circuit includes a third rectifier and a source of bias voltage of said predetermined magnitude poled to prevent current flow in said third rectifier until said voltage across said shunted circuit portion exceeds said predetermined value.

6. An electrical conversion network comprising a pair of input terminals, a first circuit connected between said terminals and including a first rectifier and a load device having a predetermined resistance, a second circuit connected between said terminals and including said load device and a second rectifier oppositely poled with respect to said first rectifier, the ratio between the resistance of said load device and the total resistance in said first circuit being greater than the ratio between the resistance of said load device and the total resistance in said second circuit, a source of unidirectional voltage, and a third circuit connected in parallel with said load device and including a third rectifier and said voltage source.

7. An electrical conversion network comprising a pair of input terminals adapted to be connected to a source of variable magnitude alternating voltage, a first circuit connected between said terminals and comprising a first rectifier and resistive elements including a load device, a second circuit connected between said terminals and comprising resistive elements including said load device and a second rectifier oppositely poled with respect to said first rectifier, said load device forming with said resistive elements voltage dividers of unequal magnitude in said circuits whereby to provide magnitude inequalities between voltages derived from said alternating voltage and developed across said load device by said rectifiers, a source of unidirectional voltage, and a third circuit shunting a portion of one of said first and second circuits and including a third rectifier and said voltage source.

8. An electrical conversion network comprising a pair of input terminals adapted to be connected to a source of variable magnitude alternating voltage, a first circuit connected between said terminals and comprising a first rectifier and resistive elements including a load device, a second circuit connected between said terminals and comprising resistive elements including said load device and a second rectifier oppositely poled with respect to said first rectifier, said load device forming with said resistive elements voltage dividers of unequal magnitude in said circuits whereby to provide magnitude inequalities between voltages derived from said alternating voltage and developed across said load device by said rectifiers, a potentiometer-type resistor connected in parallel with said load device and having a movable tap, a source of unidirectional voltage, and a circuit connected between said tap and one end of said potentiometer and including a third rectifier and said voltage source.

9. A network as defined in claim 8 wherein said second rectifier is connected between said tap and one of said input terminals so that said load device and a portion of said potentiometer comprise a voltage divider in said second circuit.

10. A network as defined in claim 8 wherein said third circuit comprises a portion both of said first circuit and of said second circuit.

11. An electrical conversion network comprising a pair of input terminals, a first circuit connected between said terminals and including a first rectifier and a load device, a potentiometer-type resistor connected in parallel with said load device and having a movable tap, a second circuit shunting the series combination of said first rectifier and a portion of said resistor and including a second rectifier oppositely poled with respect to said first rectifier, a source of unidirectional voltage, and a third circuit connected in parallel with said portion of said resistor and including a third rectifier and said voltage source.

12. An electrical control system for controlling the operation of a voltage-responsive element in accordance with variations in the magnitude of an alternating voltage, said system comprising a voltage-responsive element, rectifying circuits connected to said element to furnish to said element a resultant voltage containing opposite polarity unidirectional voltage components derived by said rectifying circuits from said alternating voltage, means in said rectifying circuits providing magnitude inequalities between said unidirectional voltages, and a circuit connected in shunt with a portion of one of said rectifying circuits and responsive to voltages of greater than a predetermined magnitude across said shunted circuit portion to alter said voltage magnitude inequalities whereby to alter the magnitude relations between said resultant voltage and said alternating voltage.

FRANCIS D. GREENLEAF.

REFERENCES CITED

The following references are of record in the file of this patent:

UNITED STATES PATENTS

| Number | Name | Date |
| --- | --- | --- |
| 2,095,742 | Haller | Oct. 12, 1937 |
| 2,259,070 | Krochmann | Oct. 14, 1941 |
| 2,337,932 | Rogers | Dec. 28, 1943 |
| 2,431,994 | Dibrell et al. | Dec. 2, 1947 |
| 2,443,534 | Eglin | June 15, 1948 |